United States Patent Office 3,507,907
Patented Apr. 21, 1970

3,507,907
PROCESS OF PRODUCING β-ALKOXY CROTONIC ACID ESTERS
Hans Brinkhoff, Munich, Germany, assignor to Spezialchemie G.m.b.H. & Co., Munich, Germany, a German company
No Drawing. Filed July 26, 1967, Ser. No. 655,991
Claims priority, application Germany, July 29, 1966, S 105,117
Int. Cl. C07c 69/66
U.S. Cl. 260—484          11 Claims

ABSTRACT OF THE DISCLOSURE

An improved process of producing β-alkoxy crotonic acid lower alkyl esters, such as β-methoxy crotonic acid ethyl ester or β-ethoxy crotonic acid ethyl ester by reacting an orthoformic acid lower alkyl ester such as orthoformic acid trimethyl or triethyl ester with aceto acetic acid esters in alkanolic solution with the addition of a hydrogen halide such as hydrochloric acid as catalyst. The reaction proceeds at room temperature within a short period of time. The β-lower alkoxy crotonic acid lower alkyl ester is recovered by fractional distillation in an almost quantitative yield and of a purity permitting its use, without further purification, as starting material in the synthesis of kavain and the like kava-α-pyrons by condensation of a γ-bromo-β-alkoxy crotonic acid ester with substituted or unsubstituted cinnamic aldehyde compounds.

---

The present invention relates to an improved process of producing crotonic acid ester compounds and more particularly to a process of producing β-lower alkoxy crotonic acid esters.

β-Alkoxy crotonic acid esters are important starting materials for the production of kavain and other kava-α-pyron compounds such as methysticin, yangonin, and the like. These kava-α-pyrone compounds are obtained by brominating the β-alkoxy crotonic acid ester to γ-bromo-β-alkoxy crotonic acid ester and condensing said ester with substituted or unsubstituted cinnamic aldehyde compounds to kavain and kava-α-pyron compounds.

It is known to produce β-alkoxy crotonic acid esters by reacting aceto acetic acid esters with diazomethane whereby β-methoxy crotonic acid esters are obtained. These esters are important starting materials in the synthesis of kavain and kava-α-pyron compounds such as methysticin according to Kostermans ("Recueil" vol. 70 (1951), pages 79–82). This method of producing β-methoxy crotonic acid esters, however, is quite complicated and the yields are low. Furthermore, operating with diazomethane is rather dangerous.

Other methods of producing β-alkoxy crotonic acid esters by alkoxylation of aceto acetic acid ester make use of orthoformic acid esters. According to one of these methods, aceto acetic acid ester is first mixed with orthoformic acid ester and then with pure acetylchloride, both in molecular proportions, and the mixture is heated on the water bath. After the vigorous reaction accompanied by considerable generation of hydrochloric acid has ceased, heating is continued for one more hour. Thereafter, the reaction mixture is distilled in a vacuum and the resulting reaction product is freed of any aceto acetic acid ester present therein by repeated shaking with sodium hydroxide solution. Thereafter, the β-alkoxy crotonic acid ester is purified by distillation at atmospheric pressure.

This process has been modified by distilling off the most volatile components of the reaction mixture, i.e. the formic acid ester and the acetic acid ester, pouring the residue into cooled, dilute sodium hydroxide solution, extracting it in ether, shaking the ethereal solution several times with sodium hydroxide solution, drying the thus treated solution, and distilling off the ether. The yield of β-alkoxy crotonic acid ester is about 50% of the theoretical yield.

According to the following method, a somewhat better yield is obtained, namely a yield of about 70% of the theoretical yield. Thereby, 104 g. of aceto acetic acid ester, 120 g. of ethanol, 120 g. of orthoformic acid ester, and 4 g. of anhydrous ferric chloride are heated under reflux for 6 hours. Most of the alcohol is then distilled off. The residue is diluted with ether. Ferric chloride is removed therefrom by the addition of a small amount of ice water. The ethereal solution is then shaken with sodium hydroxide solution until no more ferric chloride can be detected. It is then dried over magnesium sulfate and subjected to fractional distillation, whereby most of the reaction product distills at 197–200° C. If a considerable amount of the reaction product distills at higher temperature, for instance, at 200–210° C., this indicates that diethoxy butyric acid ester is present in the reaction product. Said saturated di-ester can be converted into β-ethoxy crotonic acid ester by boiling with acetic acid anhydride.

Thus alkoxylation by means of orthoformic acid esters according to said known processes produces the β-alkoxy crotonic acid esters in a yield of, at most, 50%, when operating in the presence of acetylchloride, or of 70%, when operating with ferric chloride. According to the last mentioned process, however, there is obtained a yield of only 50% to 60% on technical operation. Such a low yield, as is understood, does not permit the use of the β-alkoxy crotonic acid esters as starting materials in the large scale production, for instance, of kavain or other kava-α-pyron compounds, because the process is highly uneconomical.

It is one object of the present invention to provide a simple and effective process of producing β-lower alkoxy crotonic acid lower alkyl esters in an almost quantitative yield.

Other objects of the present invention and advantageous features thereof will become apparent as the description proceeds.

In principle the process according to the present invention comprises (a) Mixing substantially molecular amounts of an orthoformic acid lower alkyl ester, especially orthoformic acid methyl or ethyl ester with an aceto acetic acid lower alkyl ester, especially with aceto acetic acid ethyl ester, (b) Adding a solution of hydrogen halide in a lower alkanol, especially methanol or ethanol to said mixture, thereby causing alkoxylation of the aceto acetic acid ester substantially at room temperature, and (c) Substantially immediately after said addition subjecting the reaction mixture to fractional distillation, i.e. without boiling the mixture under reflux.

The first fraction distills between 45° C. and 80° C. whereby almost no intermediate fraction is collected. The main fraction distills between 188° C. and 193° C. The yield is almost 100%.

In addition to the surprisingly high yield the process according to the present invention has the further advantage that the resulting β-alkoxy crotonic acid ester is obtained in such a pure state that it can be subjected directly, without further purification, to bromination. In contrast thereto it is not possible to use the β-alkoxy crotonic acid ester obtained in a low yield according to the above mentioned known processes directly for further reaction. The ester must be subjected to complicated purification processes.

Furthermore, because no prolonged thermal treatment, such as boiling under reflux, is required, the short reaction time of the process according to the present invention allows not only the production of considerably larger amounts of the β-alkoxy crotonic acid ester within the same period of time than when proceeding according to the known processes but also eliminates, or considerably reduces, any danger of decomposition.

It is not necessary that a completely water-free alcoholic solution is employed when proceeding according to the process of the present invention. The heretofore known processes, in contrast thereto, require such a completely anhydrous alkanol or solvent. In fact, the alcoholic hydrogen halide solution used in the present process can simply be prepared by adding up to 5% of an aqueous concentrated hydrogen halide solution to, for instance, 95% ethanol. The water content of such a solution does not affect at all the reaction.

The following examples serve to illustrate the present invention without, however, limiting the same thereto.

EXAMPLE 1

1,300 g. of aceto acetic acid ethyl ester are mixed with 1,060 g. of orthoformic acid trimethyl ester. A solution of 5 cc. of concentrated hydrochloric acid, acting as catalyst, in 1,000 cc. of methanol is added thereto. The reaction mixture is distilled immediately after the addition of the hydrochloric acid-containing methanol. 1440 g. of β-methoxy crotonic acid ethyl ester are recovered as fraction boiling between 188° C. and 193° C. The yield is 100% of the theoretical yield.

EXAMPLE 2

1,300 g. of aceto acetic acid ethyl ester are mixed with 1,450 g. of orthoformic acid triethyl ester. A solution of 5 cc. of concentrated hydrochloric acid, acting as catalyst, in 1000 cc. of ethanol is added thereto. The reaction mixture is distilled immediately after the addition of the hydrochloric acid-containing ethanol. 1,580 of β-ethoxy crotonic acid ethyl ester are recovered as fraction boiling between 195° C. and 200° C. The yield is 100% of the theoretical yield.

In place of hydrochloric acid there may be used equimolecular amounts of hydrobromic acid or hydroiodic acid. However, the preferred hydrogen halide is hydrochloric acid. It is highly surprising that hydrogen halide can be used as catalyst and that the yield on alkoxylation is quantitative; for it is well known that orthoformic acid esters are rapidly decomposed even by traces of acids.

The amount of hydrogen halide may vary but it should not exceed about 5% of the sum of the reactants. Preferred amounts are between 0.08% and about 0.4% and advantageously up to 0.2%. The preferred catalyst solution is a solution which contains 0.5% of an aqueous concentrated hydrogen halide solution dissolved in an alkanol such as methanol or ethanol.

Of course, many changes and variations in the reactants, the solvents, and the hydrogen halide used in the examples, their amounts, the methods of recovering and isolating the resulting β-lower alkoxy crotonic acid alkyl esters, and the like may be made by those skilled in the art in accordance with the principles set forth herein and in the claims annexed hereto.

I claim:
1. In a process of producing β-lower alkoxy crotonic acid lower alkyl esters, the steps which comprise
    (a) mixing an orthoformic acid lower alkyl ester with an aceto acetic acid lower alkyl ester,
    (b) adding to said mixture substantially at room temperature a solution of a small amount of hydrogen halide in a lower alkanol, and
    (c) subjecting the reaction mixture to fractional distillation substantially immediately after said addition to recover the resulting β-lower alkoxy crotonic acid lower alkyl ester.
2. The process according to claim 1, wherein the aceto acetic acid ester is aceto acetic acid ethyl ester, the orthoformic acid ester is orthoformic acid methyl ester, and the lower alkanol is methanol.
3. The process according to claim 1, wherein the aceto acetic acid ester is aceto acetic acid ethyl ester, the orthoformic acid ester is orthoformic acid ethyl ester, and the lower alkanol is ethanol.
4. The process according to claim 1, wherein the hydrogen halide is hydrochloric acid.
5. The process according to claim 2, wherein the hydrogen halide is hydrochloric acid.
6. The process according to claim 3, wherein the hydrogen halide is hydrochloric acid.
7. The process according to claim 1, wherein the amount of hydrogen halide calculated for the amount of reactants does not exceed about 5% thereof.
8. The process according to claim 1, wherein the amount of hydrogen halide calculated for the amount of reactants is between about 0.08% and about 0.4% thereof.
9. The process according to claim 1, wherein the amount of hydrogen halide calculated for the amount of reactants is between about 0.08% and about 0.2% thereof.
10. The process according to claim 1, wherein the solution of hydrogen halide in the lower alkanol contains up to 5% of hydrogen halide.
11. The process according to claim 1, wherein the solution of hydrogen halide in the lower alkanol is a mixture of about 5 cc. of aqueous concentrated hydrochloric acid in 1000 cc. of the lower alkanol.

References Cited

UNITED STATES PATENTS 2,571,212   10/1951   Croxall et al. _____ 260—484

JAMES A. PATTEN, Primary Examiner

P. KILLOS, Assistant Examiner

U.S. Cl. X.R.

260—240